(12) United States Patent
Al-Mouhamed et al.

(10) Patent No.: US 8,770,905 B2
(45) Date of Patent: Jul. 8, 2014

(54) ANTHROPOMORPHIC FORCE-REFLECTIVE MASTER ARM

(75) Inventors: Mayez Al-Mouhamed, Dhahran (SA); Nesar Merah, Dhahran (SA)

(73) Assignees: King Fahd University of Petroleum and Minerals, Dhahran (SA); King Abdulazia City for Science and Technology, Riyadh (SA)

( * ) Notice: Subject to any disclaimer, the term of this patent is extended or adjusted under 35 U.S.C. 154(b) by 642 days.

(21) Appl. No.: 13/099,140

(22) Filed: May 2, 2011

(65) Prior Publication Data
US 2011/0206481 A1    Aug. 25, 2011

Related U.S. Application Data

(63) Continuation-in-part of application No. 12/289,792, filed on Nov. 4, 2008, now abandoned.

(51) Int. Cl.
*B25J 3/00* (2006.01)
*G05G 9/047* (2006.01)

(52) U.S. Cl.
CPC ......... *B25J 3/00* (2013.01); *G05G 2009/04766* (2013.01); *Y10S 901/08* (2013.01); *Y10S 901/21* (2013.01); *Y10S 901/23* (2013.01)
USPC ................ 414/5; 414/1; 414/6; 414/7; 901/8; 901/21; 901/23

(58) Field of Classification Search
CPC ..... G05G 2009/04766; B25J 4/00; B25J 3/00
USPC ................................ 414/5, 6, 7; 901/8, 21, 23
See application file for complete search history.

(56) References Cited

U.S. PATENT DOCUMENTS

| | | | |
|---|---|---|---|
| 2,846,084 A * | 8/1958 | Olsen et al. | 414/5 |
| 4,806,066 A * | 2/1989 | Rhodes et al. | 414/729 |
| 4,903,536 A | 2/1990 | Salisbury, Jr. et al. | |
| 5,193,963 A | 3/1993 | McAffee et al. | |
| 5,207,114 A | 5/1993 | Salisbury, Jr. et al. | |
| 5,389,865 A | 2/1995 | Jacobus et al. | |
| 5,459,382 A | 10/1995 | Jacobus et al. | |
| 5,629,594 A | 5/1997 | Jacobus et al. | |
| 5,652,603 A | 7/1997 | Abrams | |
| 5,755,645 A | 5/1998 | Miller et al. | |
| 5,831,408 A | 11/1998 | Jacobus et al. | |
| 5,898,599 A | 4/1999 | Massie et al. | |
| 5,943,914 A | 8/1999 | Morimoto et al. | |
| 6,020,875 A | 2/2000 | Moore et al. | |
| 6,104,158 A | 8/2000 | Jacobus et al. | |
| 6,104,382 A | 8/2000 | Martin et al. | |
| 6,296,635 B1 | 10/2001 | Smith et al. | |
| 6,330,837 B1 | 12/2001 | Charles et al. | |
| 6,405,158 B1 | 6/2002 | Massie et al. | |
| 6,417,638 B1 | 7/2002 | Guy et al. | |
| 6,543,740 B2 | 4/2003 | Gaunt et al. | |

(Continued)

*Primary Examiner* — Scott Lowe
(74) *Attorney, Agent, or Firm* — Richard C. Litman (57) ABSTRACT

The anthropomorphic force-reflective master arm is a light, anthropomorphic, back-drivable, six degree of freedom (DOF) master arm designed to control the motion of a remote slave device having arbitrary structure. Three of the link members are rotationally coupled to each other to form a handle, such that axes of rotation of each of the handle link members intersects at the user's hand position. The kinematics of the master arm is simplified to two independent subsystems, which are the hand position and hand orientation.

17 Claims, 7 Drawing Sheets

(56) References Cited

U.S. PATENT DOCUMENTS

| | | |
|---|---|---|
| 6,764,445 B2 | 7/2004 | Ramans et al. |
| 6,786,896 B1 | 9/2004 | Madhani et al. |
| 6,801,008 B1 | 10/2004 | Jacobus et al. |
| 6,985,133 B1 | 1/2006 | Rodomista et al. |
| 7,143,972 B2 | 12/2006 | Finnoy |
| 7,623,945 B2 * | 11/2009 | Kraft ............................ 700/245 |
| 7,628,093 B2 * | 12/2009 | Madhani et al. ........... 74/490.04 |

* cited by examiner

ANTHROPOMORPHIC FORCE-REFLECTIVE MASTER ARM

CROSS-REFERENCE TO RELATED APPLICATION

This application is a continuation-in-part of U.S. patent application Ser. No. 12/289,792, filed Nov. 4, 2008.

BACKGROUND OF THE INVENTION

1. Field of the Invention

The present invention relates to robotic control systems, and particularly to an anthropomorphic force-reflective master arm that allows a human operator to map his hand motion to a remote slave tool in unstructured environments in which autonomous robots cannot be used.

2. Description of the Related Art

It is often necessary that a human operator manually control the motion of a remote tool being held by an arbitrary slave device, e.g., a robotic arm manipulating a device outside a satellite in space, an underwater robotic arm, etc. The remote slave device is sometimes located in a hostile or unstructured environment, which justifies the need to keep the human operator in a safe remote location. The interconnection between the human interface system and the slave device is arbitrary, and may use a dedicated or public network. The interface is designed to permit the operator hand-operated translation and rotation of the control, and to transmit such changes to the slave device so that the changes are superimposed to a current tool position and orientation.

An improvement to this human interface would provide the capability to simultaneously measure all hand changes in position and orientation in order to minimize the number of iterations needed for tool set up in a desired configuration. Forces and torques exerted on the tool by a workpiece would be streamed from the slave device to reflect back on the operator's hand. The interface must provide force feedback to let the operator feel the forces displayed on its motors. An increased force feedback gain is desired to provide acceptable fidelity and sensitivity to small force/torque feedback magnitudes because the interface inertia felt at the operator hand must be very small.

Thus, an anthropomorphic force-reflective master arm solving the aforementioned problems is desired.

SUMMARY OF THE INVENTION

The anthropomorphic force-reflective master arm is a lightweight, backdrivable, six degree of freedom robotic arm that can serve as a master arm to control the motion of a remote slave arm. The master arm includes up to six serially connected rotary joints that extend from a grounded base to a handle that can be grasped and manipulated by an operator. The grounded base houses six motors. The position of operator hand origin depends only on the first three rotary joints (nearest to the base). The last three rotary joints (nearest to the handle) have concurrent rotation axes that intersect at the operator hand origin and are used for rendering the rotation of the operator's hand.

A lightweight, balanced mechanism is used for the last three rotary joints, which are arranged to directly measure operator forearm rotation, operator horizontal elevation, and operator vertical elevation, respectively. The operator feels the same impedance in all rotational directions due to the balanced mechanism in the last three rotary joints, which improves force feedback fidelity. This arrangement uncouples hand translation from hand orientation.

Since the motors are grounded at the base, a back drivable transmission uses pre-tensioned cable and lightweight pulleys to connect each motor to its corresponding joint. The fidelity and reversibility of the transmission mechanism facilitates the display of kinesthetic force feedback on the operator hand. The master arm provides a singularity-free mechanism to render the operator hand motion and map it to a remote tool while providing a high fidelity kinesthetic force display. The master arm weighs three kilograms, has more than one cubic meter of work envelope, and has better similarity to the human arm than previous designs.

Sensors determine movement of the handle and transmit corresponding signals to a control computer. The control computer maps movement of the handle to a remote slave arm. Similarly, sensors at the remote slave arm determine reactive forces resulting from the mapped movement of the slave arm and transmit corresponding signals to the control unit. The control unit sends corresponding signals to activate the motors at the base of the master arm to reflect the forces encountered by the slave arm to the handle, so that the operator senses reaction of the workpiece to movement of the slave arm as though the operator were manipulating the slave arm directly.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
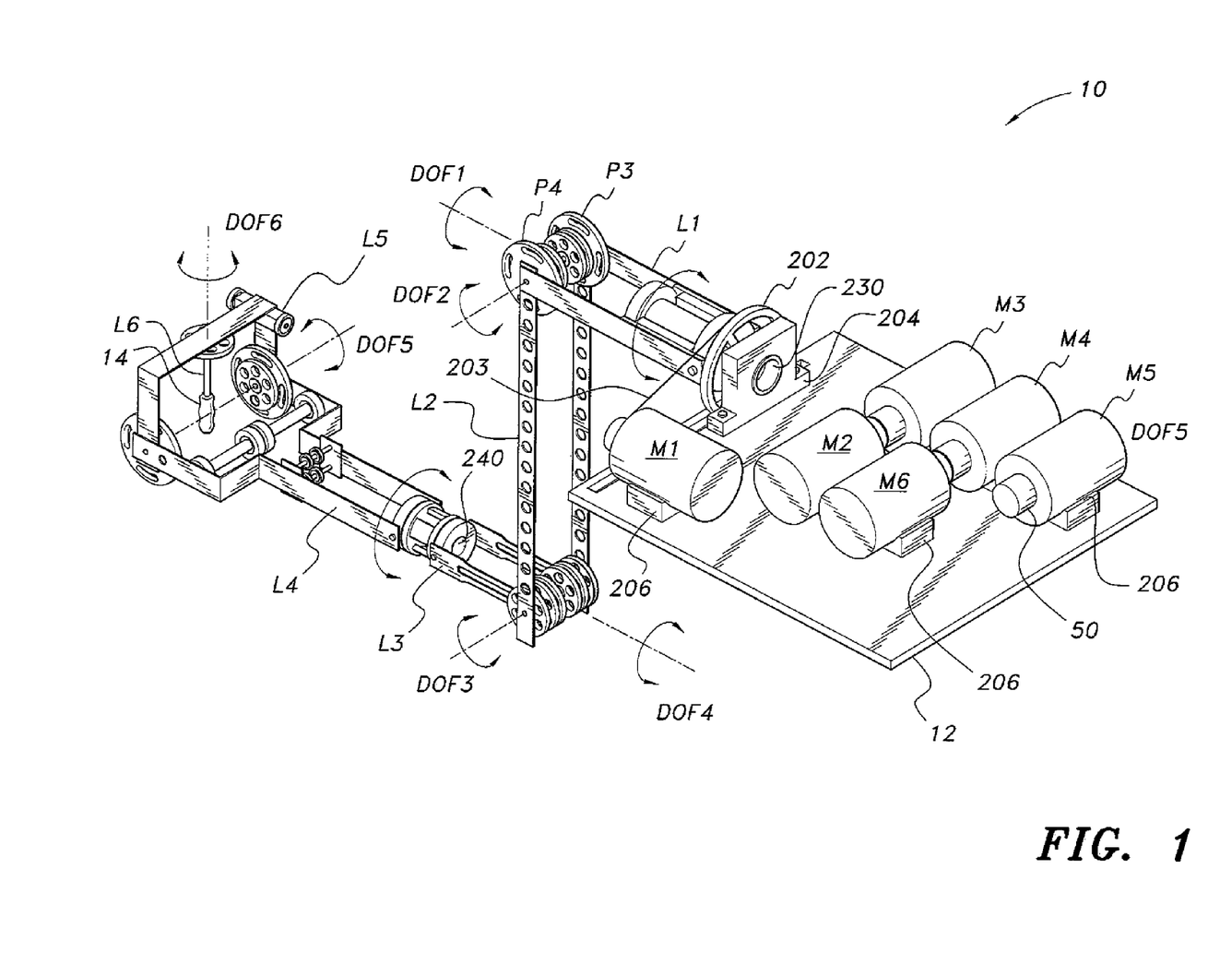
FIG. 1 is a perspective view of an anthropomorphic force-reflective master arm according to the present invention, the cables being omitted for clarity.

As shown in FIG. 1, the present invention relates to an anthropomorphic force-reflective robotic master arm (AFRMA) 10 that includes a plurality of links serially connected at rotary joints. The arm 10 extends from a base 12 to a handle 14 in a fashion similar to a human arm. A plurality of motors M1 through M6 are disposed on the base 12 by mounting blocks 206 to generate force/torque components according to feedback from a slave (remote) arm. Location of the motors M1 through M6 on the base 12 instead of at the rotational link joints improves the responsiveness of the arm 10.

Figure 3:
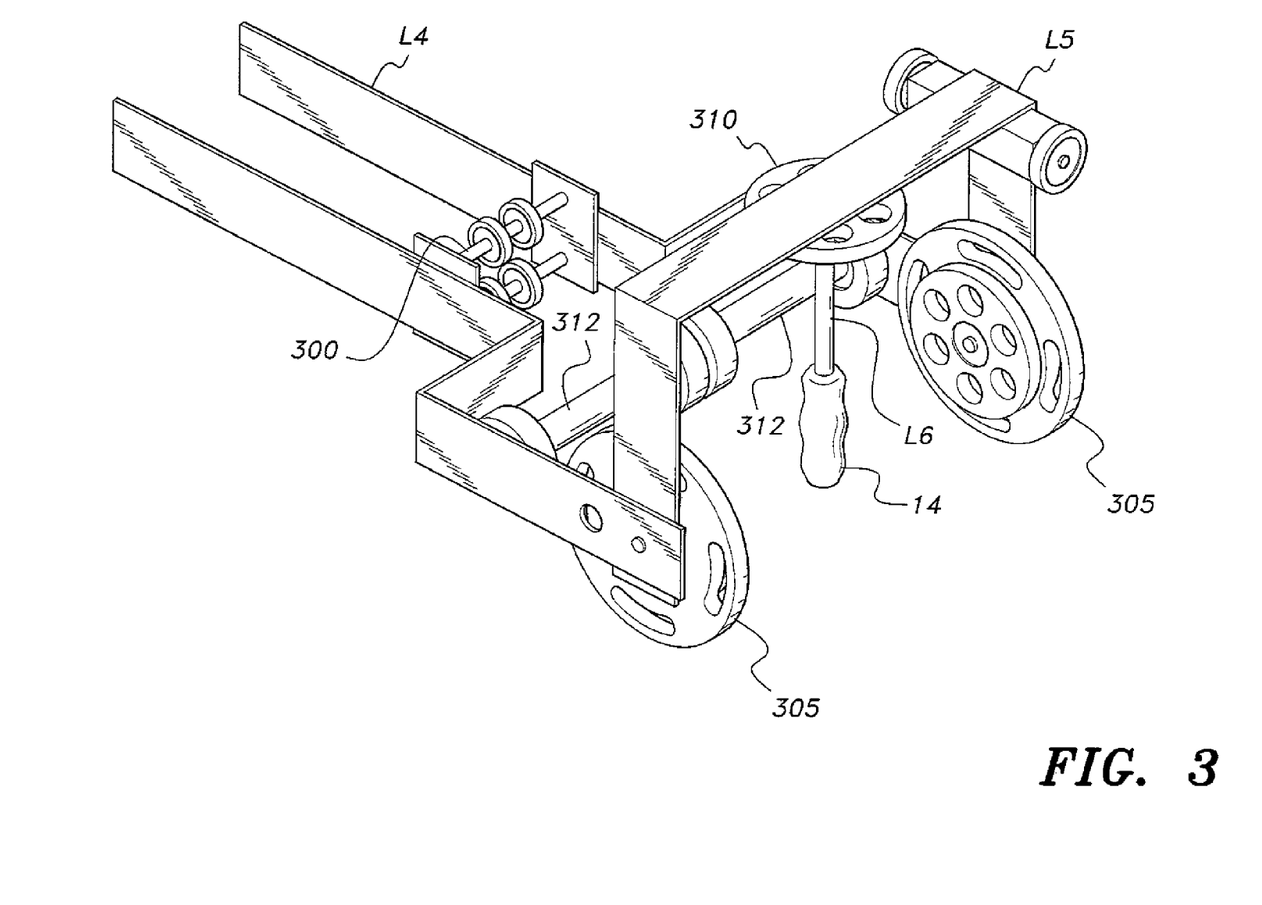
FIG. 3 is a perspective view of a cable guide system for degrees of freedom 4, 5 and 6 of an anthropomorphic force-reflective master arm according to the present invention.
Figure 4:
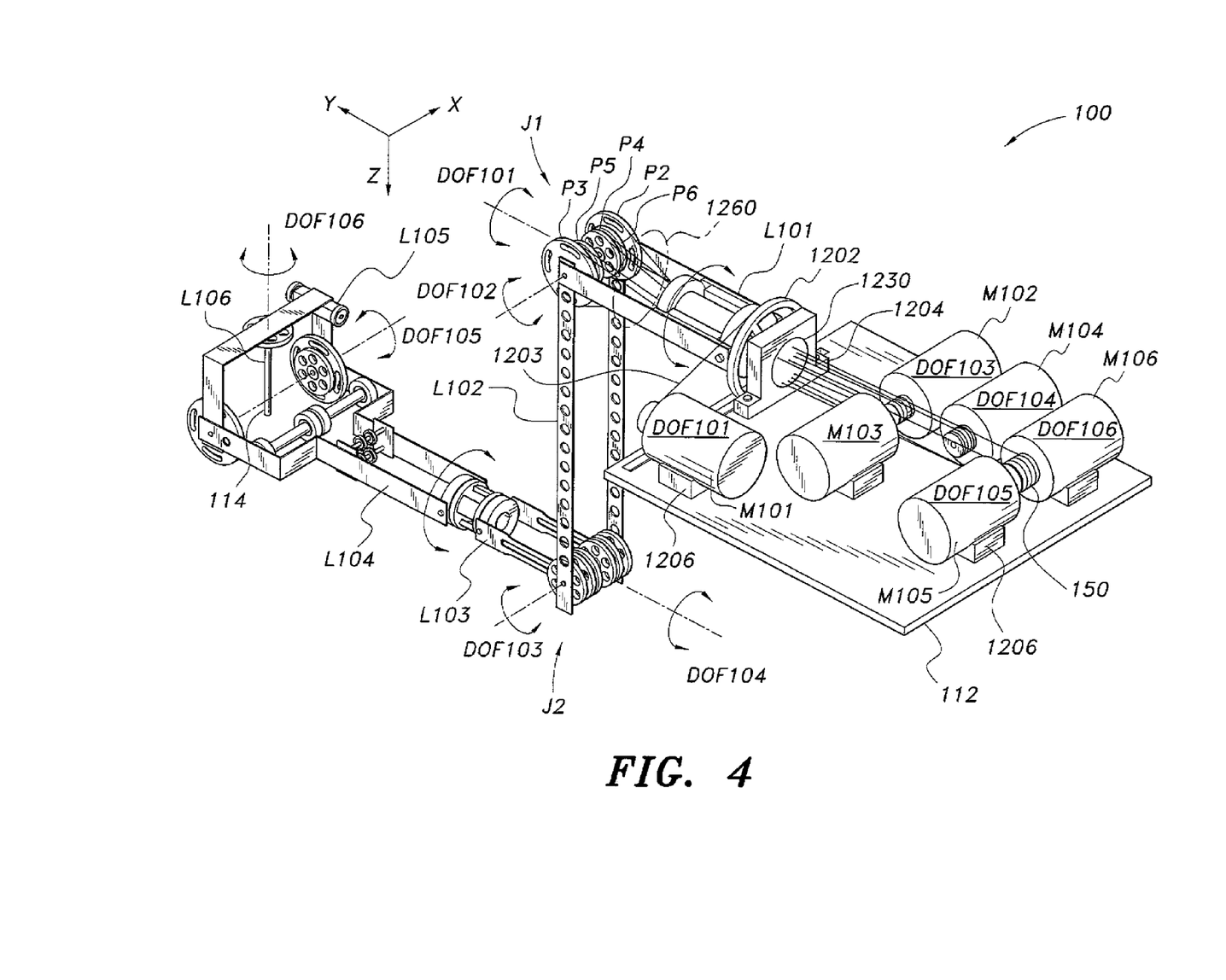
FIG. 4 is a perspective view of an alternative embodiment of an anthropomorphic force-reflective master arm according to the present invention.

In FIG. 1, a reducer pulley 202 is mounted on link L1 and driven by motor M1 using a flexible steel rope drive 203. In the configuration shown, link L1 has a hollow cylinder 230 extending axially between the link L1 side arms. Ten cables extend through cylinder 230 to drive the five links L2 through L6. FIG. 4 shows a cable orientation schematic for an interlink transmission 1260 including the ten cables 2, 2', 3, 3', 4, 4', 5, 5' and 6, 6', which are connected to threaded roller group A2 through A6 of FIG. 4. Each roller is mounted on a shaft of corresponding motor M2 through M6, respectively. Further, cables 6, 6' are associated with DOF6 and connected to threaded wheel (pulley) 310, which is shown in FIG. 3. A low-friction pulley mechanism is used to guide the cables 2 through 6' from the motor rollers A2-A6 to the interlink transmission and, more particularly, to small-diameter pulleys at each of the DOF2-DOF6 rotational joints. A configuration similar to cylinder 1230 is provided for the cables to traverse the fourth link L4 (of FIG. 4). The pulley-drive orientation, which includes threaded wheels P3 and P4, ensures the independence between the rotation of link L1 and the subsequent five links L2-L6.

The master arm 10 is sampled at regular time intervals by sensors connected to a control computer. Cartesian changes in operator hand position and orientation are transmitted to the control computer to map movement of a slave arm that may be kinematically different from the master arm 10. All six rotatable joints are mechanically decoupled from each other and have no backlash due to the pre-tensioned transmission cables. A remote slave arm can respond by a motion that is a replica of operator hand motion driving the master arm 10.

The motors M1-M6 of master arm 10 include threaded rollers 50 and are disposed on the fixed platform 12 to improve the dynamics of master arm 10. Transmission cables interconnect motors M1-M6 to pulleys at rotational joints DOF1-DOF6. To the extent practicable, the transmission cables associated with a first link having a specific rotational DOF extend near a rotation axis of a second, interconnected link in order to decouple rotation of the first link from rotation of the second, interconnected link. As shown in FIG. 1, the first L1 and fourth L4 links exemplify the aforementioned decoupled configuration.

Each of the first transmission loops starts with a threaded roller mounted on the electric motor shaft. The transmission wire is freely wrapped three times around the roller along a machined deep thread. Embedding the wire in the thread will practically eliminate slippage. Both ends of the rope of the first transmission loops are wrapped around the driven threaded wheel at J1. Each wire is wrapped two times around the wheel to provide an acceptable range of motion (ROM) at the end link. In the final wrap, the rope is introduced through a specially designed inclined through-hole to be completely restrained from any slippage by a tightening screw device on the side of the wheel (not shown).

Figure 2:
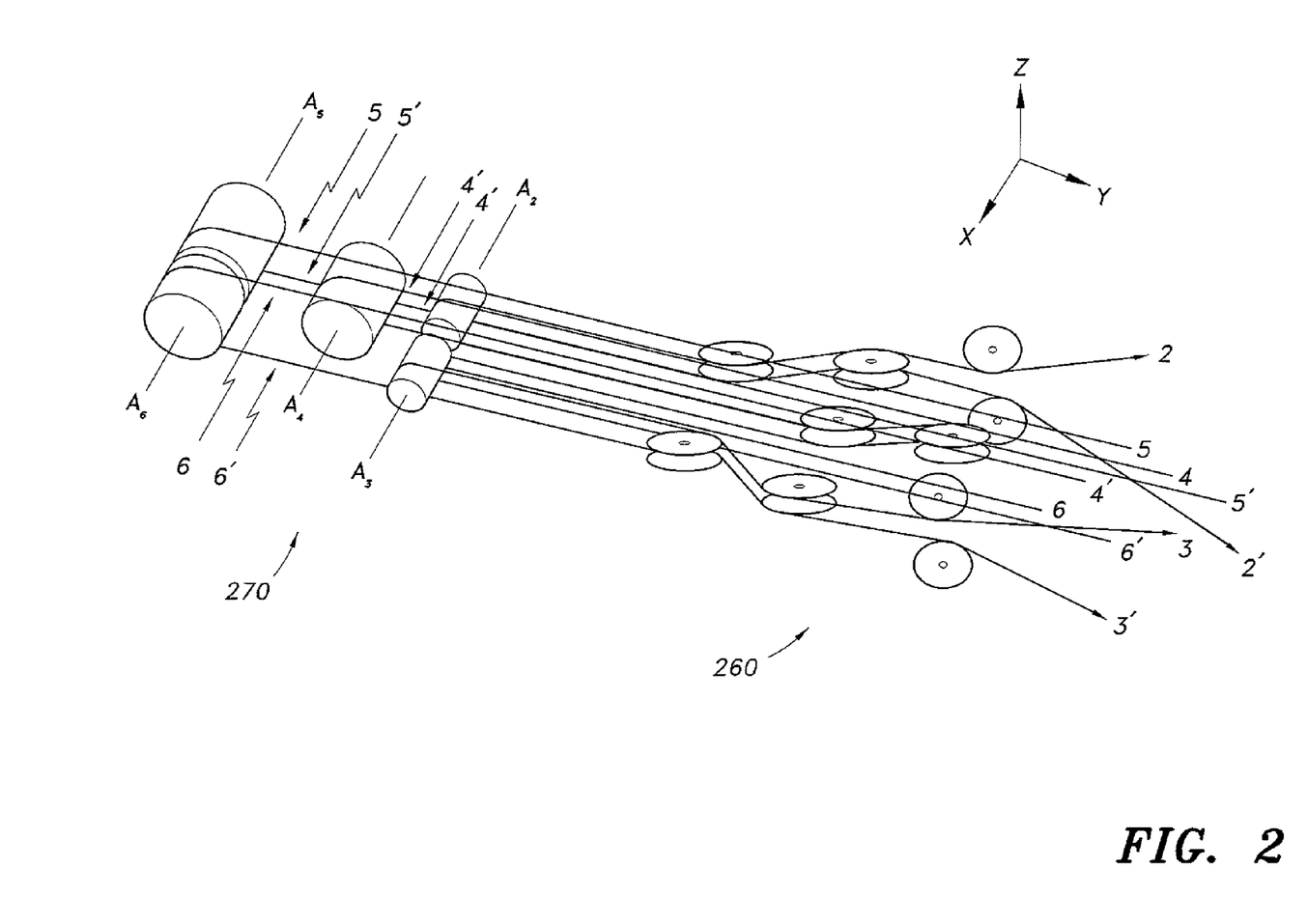
FIG. 2 is a schematic view of the cable interlink transmission and motor configuration of the anthropomorphic force-reflective master arm according to the present invention.

Again referring to FIG. 1, a reducer pulley 202 is mounted on link L1 and connected to motor M1 using a flexible steel rope 203. In the configuration shown, link L1 has a hollow cylinder 230 extending axially between the link sidearms. Ten cables extend through cylinder 230 to drive the five links L2 through L6. FIG. 2 shows a cable orientation schematic for an interlink transmission 260 comprising the ten cables (2, 2', 3, 3', 4, 4', and 5, 5'), which are connected to threaded roller group A2 through A6 of motor group 270. Moreover cables 6, 6' are associated with DOF6 and connected to pulley 310, which is shown in FIG. 3. A low friction pulley mechanism is used to guide the cables 2 through 5' from the motor rollers $A_4$-$A_6$ to the interlink transmission, more particularly, to small-dimensioned pulleys at each of the DOF1-DOF6 rotational joints. A configuration similar to cylinder 230 is provided to traverse the fourth link L4. The pulley-drive orientation, which includes threaded wheels P3 and P4, ensures the independence between the rotation of link L1 and the subsequent five links L2-L6.

The first link L1 is driven by a single loop. The following links Li (i=2, 3, 4, 5, 6) are driven by a number (i−1) cable-threaded wheel (pulley) loop assemblies (CPLs). For example, link L3 is driven by two independent CPLs; the first composed of wires 3-3' starting at roller A3 mounted on motor M3 and ending at wheel P3 in joint J1, and the second starting at wheel P3' (P3' is a smaller diameter wheel fixed to P3) and ending on P3-1 in J2. P3-1 is fixed on link L3 and drives it to execute DOF3.

In this manner, the loops remain independent to reduce physical effort required to maintain the master arm 10 in a localized area, and to improve system reliability. The independence of the CPLs reduces the length of the wire limiting it to the distance between adjacent joints which will reduce wire elongation during operation of the arm. Pre-tensioning the wire is done independently for each loop. The independent pre-tensioned configuration of wires for each cable pulley loop CPL allows a high-speed, low (force) tension cable to be used for the first n−1 CPL's and, finally, a high (force) tension wire is used for the $n^{th}$ CPL connected to the corresponding link.

The motor-link transmission 260 is based on a cable-pulley configuration that extends from a motor (one of M2-M6) to a link (one of L2-L6) through the hollow cylinders 230 and 240, while uncoupling the transmitted motion from that of the traversed link. The motor-link transmission 260 is based on the cables 2 through 5' being of a multiple, independent closed-loop variety. The connectivity between a motor (one of M1-M6) and a link (one of L1-L6) is achieved through multiple Cable Pulley Loop (CPL) mechanisms. Each CPL is an independent system. The transmission from motor to link is then achieved using an arbitrary subset of attached (pulley level) CPLs. The first loop L1 transmits motion from the motor M1 to the first link L1 (DOF1). In this and all other links, speed reduction is performed as close as possible to the intended driven link.

Each loop starts with a threaded roller mounted on the electric motor shaft. The transmission wire is freely wrapped three times around the roller along a machined deep thread. The thread pitch and depth are selected according to the rope diameter. Embedding the wire in the thread will practically eliminate slippage. Both ends of the rope are wrapped around the driven threaded wheel. Each wire is wrapped two times around the wheel (pulley) to provide an acceptable range of motion (ROM) at the end link. In the final wrap, the rope is introduced through a specially designed inclined through-hole to be completely restrained from any slippage by a tightening screw device (not shown).

The first link L1 and the second link L2 are driven by a single loop each. The following links (L2 through L6) are driven by L1 cable pulley loop assemblies (CPLs). In this manner, the loops remain independent to reduce physical effort required to maintain the master arm 10 in a localized area, and to improve system reliability. Pre-tensioning the wire is done independently for each loop. The independent pre-tensioned configuration of wires for each loop (CPL) allows a high-speed, low (force) tension cable to be used for the first n−1 CPL's and, finally, a high (force) tension wire is used for the $n^{th}$ CPL connected to the corresponding link.

Due to the aforementioned configuration of drive motors M1 through M6 and transmission cables 203, 2, 2', 3, 3', 4, 4', 5, 5', and 6,6', the master arm 10 has low friction, low inertia, and low mass. The motors M1-M6 are disposed on the stable platform 12 to eliminate the potential of damaging the master arm 10 due to excess weight and inertia. Arm fidelity is improved to thereby more accurately transmit a reflected force feedback. Mounting all of the motors M1 through M6 on base 12 provides maximum possible force/torque dynamics, as well as enlarging the force transmission bandwidth. The force/torque vector exerted on a slaved tool is sensed by a force sensor, which is generally installed at the wrist of the slave arm. The sensed vector is used to compute the force/torque vector exerted on the slaved tool. The tool force/torque vector is sampled and transmitted at regular time intervals (streamed) to the master arm station, where it is converted into a motor torque vector that reproduces the tool force/torque vector at the operator hand center 14. This allows the operator to feel the force/torque that is proportional to the one exerted on the remote tool.

As most clearly shown in FIG. 3, the L5 and L6 link members have associated pulleys 305 and 310, respectively. A user's hand grabs L6, which is a vertical member rotatably attached to and extending from L5. L6 is responsive to a twist (yaw) motion of the hand, while pivotal bracket-shaped link L5 is responsive to a pitch motion of the user's hand. Cable guides 300 are disposed on L4 and are threaded onto threaded receivers 312, making L4 responsive to a rotation (roll) of the user's hand.

FIGS. 4-7 illustrate an alternative embodiment of the anthropomorphic force-reflective robotic master arm (AFRMA) 100 that also includes a plurality of links serially connected at rotary joints. As in the previous embodiment, the arm 100 extends from a base 112 to a handle 114 in a fashion similar to a human arm. A plurality of motors M101 through M106 are disposed on the base 112 by mounting blocks 1206 to generate force/torque components according to feedback from a slave (remote) arm. Location of the motors M101 through M106 on the base 112 instead of at the rotational link joints improves the responsiveness of the arm 100.

In the alternative embodiment of FIG. 4, a motor rearrangement is utilized. The joints between links L101 and L102, and links L102 and L103, are identified as J1 and J2, respectively. All the threaded wheels (pulleys) in joint J1 are labeled as P2 through P6. The cables are drawn from the threaded rollers mounted on shafts of motors M2-M6 through the hollow cylinder 1230 to the intermediate and driven wheels in joint J1.

Figure 5:
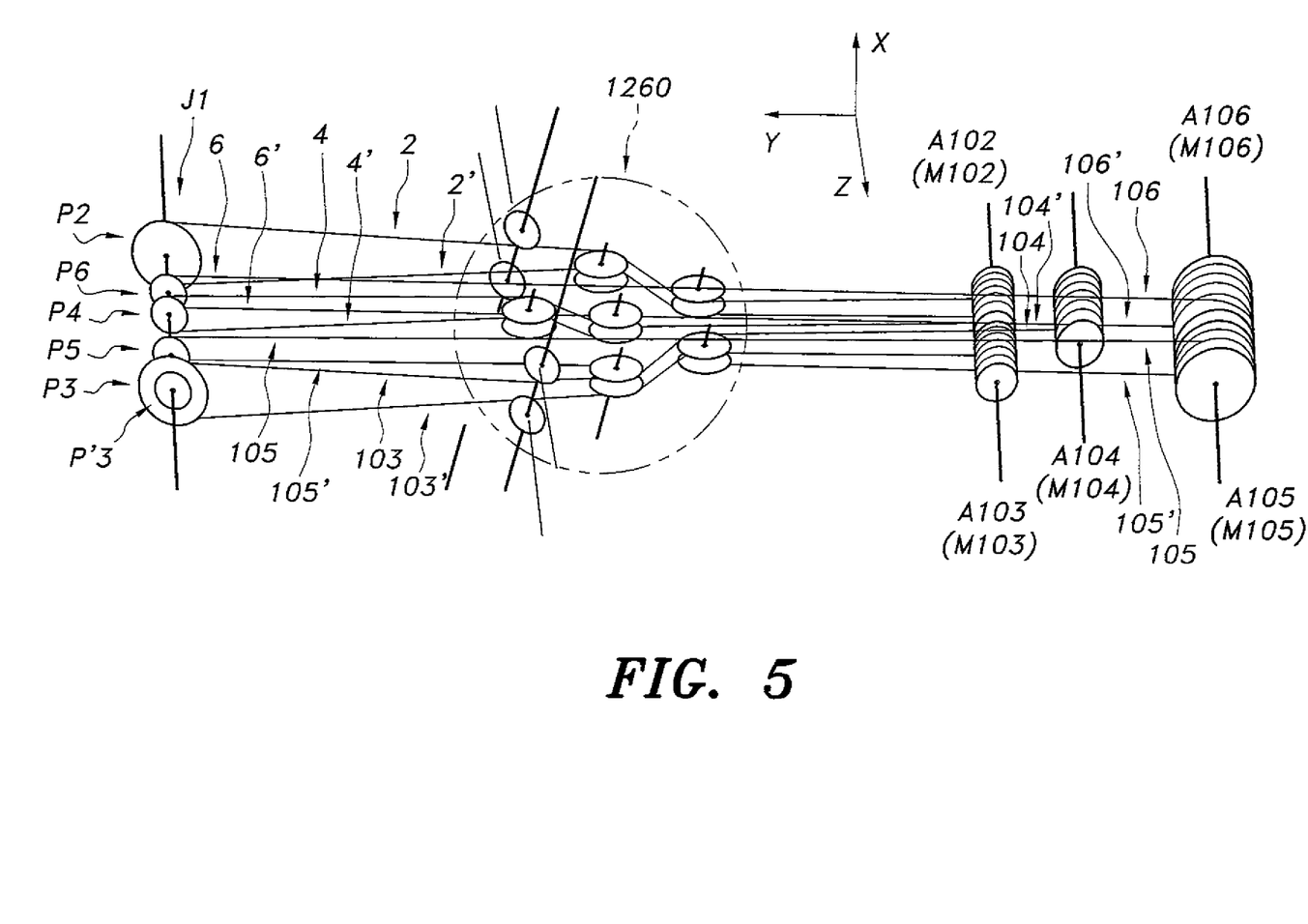
FIG. 5 is a schematic view of the cable interlink transmission and motor configuration of the anthropomorphic force-reflective master arm of FIG. 4.

The system of guiding wheels 1260 is identified in FIG. 4 but is not shown for purposes of simplification. The details of guiding wheels 1260 are shown in FIG. 5. The cables are correlated with the motors in FIG. 5 and attached to their outward pulleys in joint J1, making evident the first independent transmission cable loop. The system of pulleys 1260 FIG. 5 shows how the ropes are guided upon exiting the hollow cylinder 230 towards the threaded wheels of J1.

Figure 6:
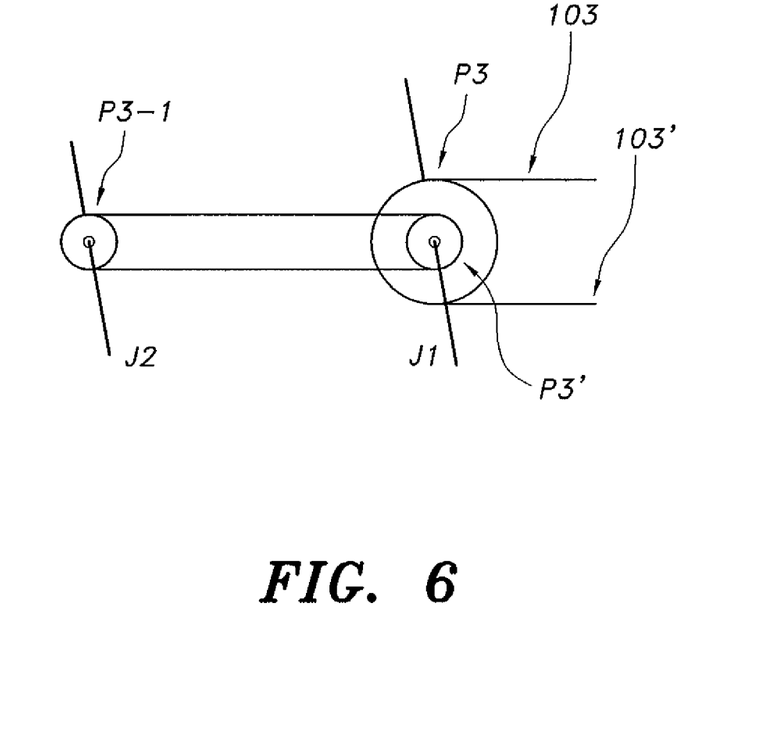
FIG. 6 is a partial schematic side view of a portion of the cable interlink transmission of FIG. 5.
Figure 7:
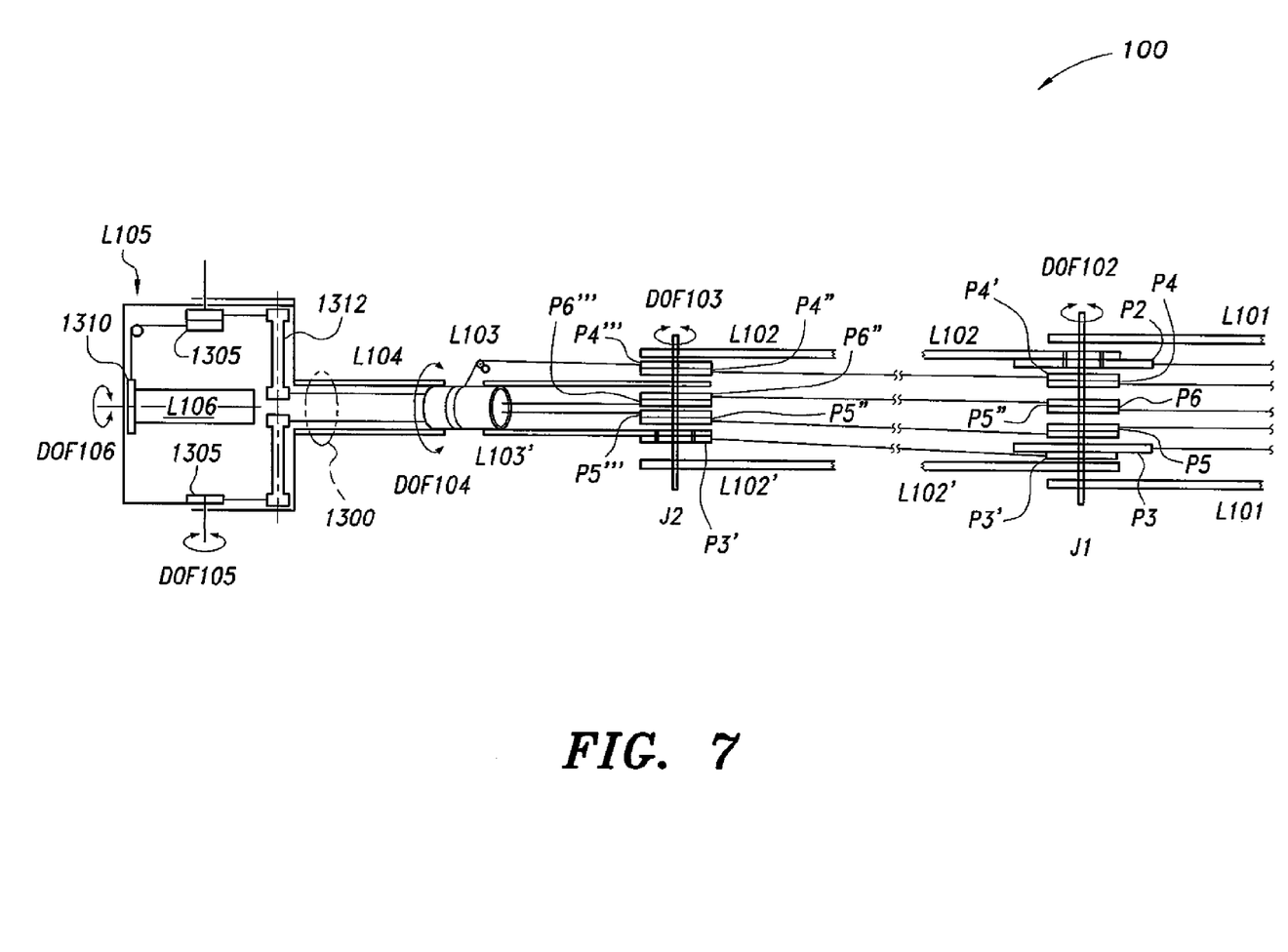
FIG. 7 diagrammatically illustrates joints, wheels, wire loops, and links of the anthropomorphic force-reflective master arm of FIG. 4.

FIG. 6 shows an example of the second transmission cable loop (multiple loops) driving DOF3 at J2 with the reduction performed at J1. Referring to FIG. 7, in joint J1, wheels P3, P4, P5 and P6 have corresponding wheels P3', P4', P5' and P6'. Wheel P2 has no P2', as it is directly attached to L102. J1 has nine wheels (two for each of P3, P4, P5, and 6) and one for P2, which is attached to L102. J2 has seven wheels (two for each of P4, P5 and P6) and one for P3, which is attached to L103. It should be noted that some wheels directly connect to their corresponding link; e.g., P2 in J1 and P3 in J2. Two cable loops for DOF5 and DOF6 go through a set of guiding pulleys 1300 and end at the pulley set 1312. FIG. 7 also shows the details of 1312 and 1305 and their loop wiring to DOF5 and DOF6.

The master arm 100 is sampled at regular time intervals by sensors connected to a control computer. Cartesian changes in operator hand position and orientation are transmitted to the control computer to map movement of a slave arm that may be kinematically different from the master arm 100. All six rotatable joints are mechanically decoupled from each other and have no backlash due to the pre-tensioned transmission cables. A remote slave arm can respond by a motion that is a replica of operator hand motion driving the master arm 100.

The motors M011-M106 of master arm 100 include threaded rollers 150 and are disposed on the fixed platform 112 to improve the dynamics of master arm 100. Transmission cables interconnect motors M101-M106 to pulleys at rotational joints DOF101-DOF106. To the extent practicable, the transmission cables associated with a first link having a specific rotational DOF extend near a rotation axis of a second, interconnected link in order to decouple rotation of the first link from rotation of the second, interconnected link. As shown in FIG. 4, the first L101 and fourth L104 links exemplify the aforementioned decoupled configuration.

Again referring to FIG. 4, a reducer pulley 1202 is mounted on link L101 and connected to motor M101 using a flexible steel rope 1203. In the configuration shown, link L101 has a hollow cylinder 1230 extending axially between the link side-arms. Ten cables extend through cylinder 1230 to drive the five links L102 through L106. FIGS. 5 and 6 show a cable orientation schematic for an interlink transmission 1260 comprising the ten cables (102, 102', 103, 103', 104, 104', and 105, 105'), which are connected to threaded roller group A102 through A106 of motor group 1270. Moreover cables 106, 106' are associated with DOF106 and connected to pulley 1310, which is shown in FIG. 7. A low friction pulley mechanism is used to guide the cables 102 through 105' from the motor rollers A104-A106 to the interlink transmission, more particularly, to small-dimensioned pulleys at each of the DOF101-DOF106 rotational joints. A configuration similar to cylinder 1230 is provided to traverse the fourth link L104. The pulley-drive orientation, which includes threaded wheels P3 and P4, ensures the independence between the rotation of link L101 and the subsequent five links L102-L106.

The motor-link transmission 1260 is based on a cable-pulley configuration that extends from a motor (one of M102-M106) to a link (one of L102-L106) through the hollow cylinders 1230 and 1240, while uncoupling the transmitted motion from that of the traversed link. The motor-link transmission 1260 is based on the cables 102 through 105' being of a multiple, independent closed-loop variety. The connectivity between a motor (one of M101-M106) and a link (one of L101-L106) is achieved through multiple Cable Pulley Loop (CPL) mechanisms. Each CPL is an independent system. The transmission from motor to link is then achieved using an arbitrary subset of attached (pulley level) CPLs. The first loop L101 transmits motion from the motor M101 to the first link L101 (DOF101). In this and all other links, speed reduction is performed as close as possible to the intended driven link.

Each loop starts with a threaded roller mounted on the electric motor shaft. The transmission wire is freely wrapped three times around the roller along a machined deep thread. The thread pitch and depth are selected according to the rope diameter. Embedding the wire in the thread will practically eliminate slippage. Both ends of the rope are wrapped around the driven threaded wheel. Each wire is wrapped two times around the wheel (pulley) to provide an acceptable range of motion (ROM) at the end link. In the final wrap, the rope is introduced through a specially designed inclined through-hole to be completely restrained from any slippage by a tightening screw device (not shown).

The first link L101 and the second link L102 are driven by a single loop each. The following links (L102 through L106) are driven by L101 cable pulley loop assemblies (CPLs). In this manner, the loops remain independent to reduce physical effort required to maintain the master arm 100 in a localized area, and to improve system reliability. Pre-tensioning the wire is done independently for each loop. The independent pre-tensioned configuration of wires for each loop (CPL) allows a high-speed, low (force) tension cable to be used for the first n−1 CPL's and, finally, a high (force) tension wire is used for the $n^{th}$ CPL connected to the corresponding link.

Due to the aforementioned configuration of drive motors M101 through M106 and transmission cables 1203, 102, 102', 103, 103', 104, 104', 105, 105', and 106, 106', the master arm 100 has low friction, low inertia, and low mass. The motors M101-M106 are disposed on the stable platform 112 to eliminate the potential of damaging the master arm 100 due to excess weight and inertia. Arm fidelity is improved to thereby more accurately transmit a reflected force feedback. Mounting all of the motors M101 through M106 on base 112 provides maximum possible force/torque dynamics, as well as enlarging the force transmission bandwidth. The force/torque vector exerted on a slaved tool is sensed by a force sensor, which is generally installed at the wrist of the slave arm. The sensed vector is used to compute the force/torque vector exerted on the slaved tool. The tool force/torque vector is sampled and transmitted at regular time intervals (streamed) to the master arm station, where it is converted into a motor torque vector that reproduces the tool force/torque vector at the operator hand center 114. This allows the operator to feel the force/torque that is proportional to the one exerted on the remote tool.

As most clearly shown in FIG. 7, the L105 and L106 link members have associated pulleys 1305 and 1310, respectively. A user's hand grabs L106, which is a vertical member rotatably attached to and extending from L105. L106 is responsive to a twist (yaw) motion of the hand, while pivotal bracket-shaped link L105 is responsive to a pitch motion of the user's hand. Cable guides 1300 are disposed on L104 and are threaded onto threaded receivers 1312, making L104 responsive to a rotation (roll) of the user's hand.

The cable corresponding to DOF106 goes through 1300 and ends at 1312. The other wheel side of 1312 is cabled to upper wheel 1305 (which is formed as two wheels), which is also connected to 1310 through another cable loop.

As shown in FIGS. 4 and 7, joint J1 includes wheels P3, P4, P5 and P6 (which have corresponding wheels P3', P4', P5' and P6', as shown in FIG. 7, forming joint J2). Wheel P2 has no corresponding linkage wheel, as it is directly attached to L102. J1 includes a total of nine wheels (two for each of P3, P4, P5, and P6) and one for P2, which is attached to L102. J2 has a total of seven wheels (two for each of P4', P5', and P6') and one for P3', which is attached to L103. It should be noted that some wheels directly connect to their corresponding link; e.g., P2 in J1 and P3 in J2.

In use, object orientation is uncoupled from object translation; i.e., where the object is held by a slave device controlled using Cartesian Coordinates by the master arm, the object changes its position accordingly when the operator only translates his or her hand in any direction without a change in object orientation. This has deep consequences on the quality of tele-operation, such as reducing the operator psychomotor effort.

Further, the kinematics of the master arm are composed of two independent sub-systems: (1) the operator hand position (object position), which only depends on the first three master arm DOFs, and (2) the operator hand orientation (object orientation), which only depends on the last three DOFs of the master arm.

Advantageously, the tele-operation targeting the setting of objects in a given geometric position and orientation requires a number of trials that is the minimum possible, as compared to any other master arm DOF arrangement having coupled positions and orientations. Further, in use, the operator feels the same mechanical impedance when rotating the hand grip in any direction of the last three rotary joints, which improves force feedback fidelity and the operator ability to identify the direction of a kinesthetic force which is displayed on the master arm.

It should be noted that, in the above, the cable pulley loop (CPL) mechanism is formed by the transmission cable connections to the pulleys being multiple, independent, and closed loop. The motion of the links is achieved through multiple transmission loop mechanisms where the first link is driven by a single loop, and the subsequent links (Li) are driven by (i−1) independent loops. The independence of the loops is to minimize wire elongation during operation (increasing reliability) and reduce maintenance effort.

It is to be understood that the present invention is not limited to the embodiment described above, but encompasses any and all embodiments within the scope of the following claims.

We claim:

1. An anthropomorphic force-reflective master arm, comprising:
    a base;
    a plurality of backdrive motors disposed on the base, the plurality including a first degree of freedom backdrive motor, the backdrive motors providing backdrive response to forces encountered by a remote slave arm for each degree of freedom of the master arm;
    threaded rollers disposed on the backdrive motors;
    force transmission cables disposed on the threaded rollers;
    a plurality of link members having joints independently and rotatably joining the link members to each other, including a first link member rotatably attached to the base;
    a plurality of pulleys, at least one of the pulleys being disposed in a corresponding one of the link member joints, the force transmission cables being attached to the pulleys;
    at least one flexible transmission member interconnecting the first link member to the first backdrive motor, the first backdrive motor providing backdrive torque to the first link member to rotate the first link member about a first degree of freedom, the first link member including an interlink transmission system; and
    a hand grip disposed at a junction of three of the link members, the three link members being independently, rotatably coupled to each other and forming handle link members, wherein an axis of rotation of each of the three handle link members intersects at a user's hand position, each of the three handle link members being connected to a corresponding one of the plurality of backdrive motors, the corresponding backdrive motor providing backdrive torque that the user can sense at the hand grip.

2. The anthropomorphic force-reflective master arm according to claim 1, wherein said link members form a six degree of freedom system, degrees four, five, and six corresponding to the three handle link members, the three handle link members being link members four, five, and six, respectively, the plurality of link members including:
   a second link member pivotally connected to the first link member to form a second degree of freedom; and
   a third link member extending from the fourth link member and being pivotally connected to the second link member to form a third degree of freedom.

3. The anthropomorphic force-reflective master arm according to claim 1, wherein the transmission cables are pre-tensioned.

4. The anthropomorphic force-reflective master arm according to claim 1, wherein the transmission cable associated with the first link has a rotational degree of freedom extending near a rotation axis of the second link to decouple rotation of the first link from rotation of the second link.

5. The anthropomorphic force-reflective master arm according to claim 1, further comprising a hollow cylinder, the hollow cylinder connecting link members three and four, thereby allowing extension of cables for degrees of freedom five and six.

6. The anthropomorphic force-reflective master arm according to claim 1, further comprising: a hollow cylindrical core extending through a longitudinal axis of the first link member, a plurality of the transmission cables extending therethrough.

7. The anthropomorphic force-reflective master arm according to claim 1, wherein the transmission cable connections to the pulleys are multiple, independent, and closed loop to form a cable pulley loop (CPL) mechanism.

8. The anthropomorphic force-reflective master arm according to claim 1, further comprising a machined deep thread disposed on each threaded roller, the machined deep thread accepting a transmission cable end wire wrapped three times around the roller.

9. The anthropomorphic force-reflective master arm according to claim 8, wherein a remaining end wire of the transmission cable is disposed with a 2× wrap around a threaded wheel at a corresponding joint, yielding a predetermined minimum range of motion at the associated link, the end of the wire being locked within the threaded wheel.

10. An anthropomorphic force-reflective master arm, comprising:
   a base;
   a plurality of backdrive motors disposed on the base, the plurality including a first degree of freedom backdrive motor, the backdrive motors providing backdrive response to forces encountered by a remote slave arm for each degree of freedom of the master arm;
   threaded rollers disposed on the backdrive motors;
   force transmission cables disposed on the threaded rollers;
   a plurality of link members having joints independently and rotatably joining the link members to each other, including a first link member rotatably attached to the base;
   a plurality of pulleys, at least one of the pulleys being disposed in a corresponding one of the link member joints, the force transmission cables being attached to the pulleys, wherein the force transmission cables are each independent and closed-loop to form a cable pulley loop mechanism;
   at least one flexible transmission member interconnecting the first link member to the first backdrive motor, the first backdrive motor providing backdrive torque to the first link member to rotate the first link member about a first degree of freedom, the first link member including an interlink transmission system; and
   a hand grip disposed at a junction of three of the link members, the three link members being independently, rotatably coupled to each other and forming handle link members, wherein an axis of rotation of each of the three handle link members intersects at a user's hand position, each of the three handle link members being connected to a corresponding one of the plurality of backdrive motors, the corresponding backdrive motor providing backdrive torque that the user can sense at the hand grip.

11. The anthropomorphic force-reflective master arm according to claim 10, wherein said link members form a six degree of freedom system, degrees four, five, and six corresponding to the three handle link members, the three handle link members being link members four, five, and six, respectively, the plurality of link members including:
   a second link member pivotally connected to the first link member to form a second degree of freedom; and
   a third link member extending from the fourth link member and being pivotally connected to the second link member to form a third degree of freedom, wherein motion of each said link member is achieved through the cable pulley loop mechanisms, such that the first link member is driven by a single cable loop, the second link member is driven by a single cable loop, and the third link member is driven by a pair of independent cable loops.

12. The anthropomorphic force-reflective master arm according to claim 11, wherein the transmission cables are pre-tensioned.

13. The anthropomorphic force-reflective master arm according to claim 12, wherein the transmission cable associated with the first link has a rotational degree of freedom extending near a rotation axis of the second link to decouple rotation of the first link from rotation of the second link.

14. The anthropomorphic force-reflective master arm according to claim 13, further comprising a hollow cylinder, the hollow cylinder connecting link members three and four, thereby allowing extension of cables for degrees of freedom five and six.

15. The anthropomorphic force-reflective master arm according to claim 14, further comprising: a hollow cylindrical core extending through a longitudinal axis of the first link member, a plurality of the transmission cables extending therethrough.

16. The anthropomorphic force-reflective master arm according to claim 15, further comprising a machined deep thread disposed on each threaded roller, the machined deep thread accepting a transmission cable end wire wrapped three times around the roller.

17. The anthropomorphic force-reflective master arm according to claim 16, wherein a remaining end wire of the transmission cable is disposed with a 2× wrap around a threaded wheel at a corresponding joint, yielding a predetermined minimum range of motion at the associated link, the end of the wire being locked within the threaded wheel.

* * * * *